United States Patent [19]

Wetzel et al.

[11] Patent Number: 4,729,399

[45] Date of Patent: Mar. 8, 1988

[54] SOLUBLE MATERIAL DISTRIBUTING DEVICE

[76] Inventors: Ray C. Wetzel, 32811 Shipside Dr., Dana Point, Calif. 92629; Jim H. Wetzel, 24111 Leeward St., Laguna Niguel, Calif. 92677

[21] Appl. No.: 890,066

[22] Filed: Jul. 24, 1986

[51] Int. Cl.⁴ .............................................. B01D 11/02
[52] U.S. Cl. ..................................... 137/268; 422/283
[58] Field of Search ............................ 137/268, 205.5; 239/310; 422/283

[56] References Cited

U.S. PATENT DOCUMENTS

| | | | |
|---|---|---|---|
| 2,044,821 | 6/1936 | Urban | 299/84 |
| 2,589,595 | 3/1952 | Aske | 299/84 |
| 2,738,323 | 3/1956 | Tepas | 137/268 UX |
| 3,017,118 | 1/1962 | Kane | 137/268 X |
| 3,068,885 | 12/1962 | Lawrence | 137/205.5 |
| 3,195,985 | 7/1965 | Elkin | 239/310 X |
| 3,864,090 | 2/1975 | Richards | 23/267 |
| 3,929,151 | 12/1975 | Rubin | 137/268 |
| 4,250,910 | 2/1981 | King | 137/268 |
| 4,385,034 | 5/1983 | Gacer | 137/268 X |
| 4,407,322 | 10/1983 | Moore | 137/268 |
| 4,420,394 | 12/1983 | Lewis | 210/169 |
| 4,548,227 | 10/1985 | Regunathan et al. | 137/268 |
| 4,635,848 | 1/1987 | Little | 239/310 X |

FOREIGN PATENT DOCUMENTS 629250 6/1936 Fed. Rep. of Germany .
521991 6/1940 United Kingdom .

*Primary Examiner*—Alan Cohan
*Attorney, Agent, or Firm*—Christie, Parker & Hale

[57] ABSTRACT

A material feeder device is provided for containing a material that is soluble in water and through which a water stream passes to thereby dissolve the material and deliver it to a lawn or garden through a sprinkler system. The feeder includes a housing open at its top and bottom, which contains the material to be dissolved. The open bottom of the housing provides an outlet for the water stream. A lid assembly is connected to the housing for closing the top of the housing when it is in a first position and for opening the top of a housing when it is in a second position, so that the material to be dissolved can be placed into the housing. A hollow conduit having an inlet connected to a water supply line outlet is provided. The conduit extends upwardly from its inlet through the open housing bottom with the conduit outlet being below the housing top. The only connection between the water supply line and the housing outlet is through the conduit. A check valve is mounted at the conduit outlet to prevent water from flowing back from within the housing through the conduit and into the water supply line.

8 Claims, 3 Drawing Figures

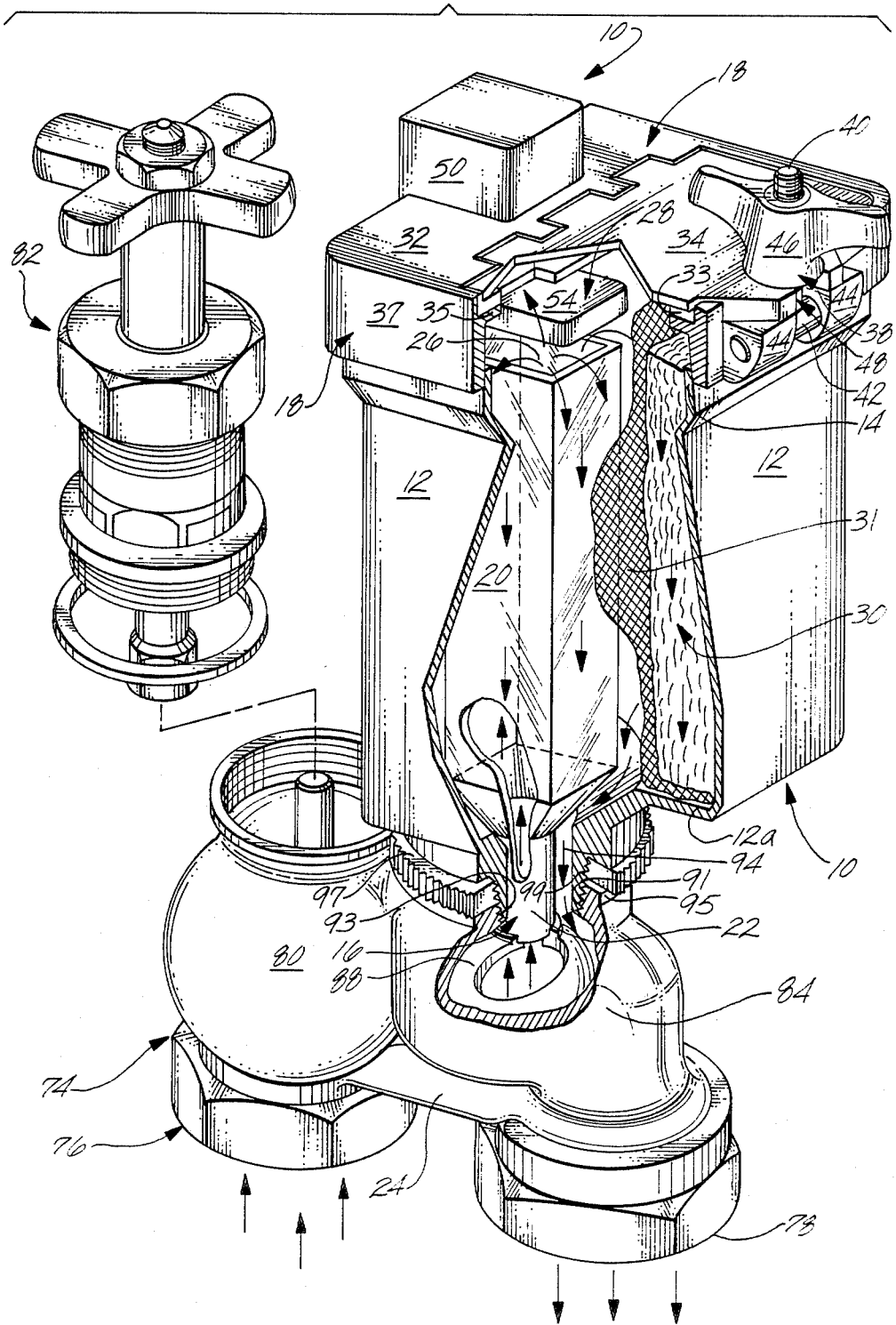

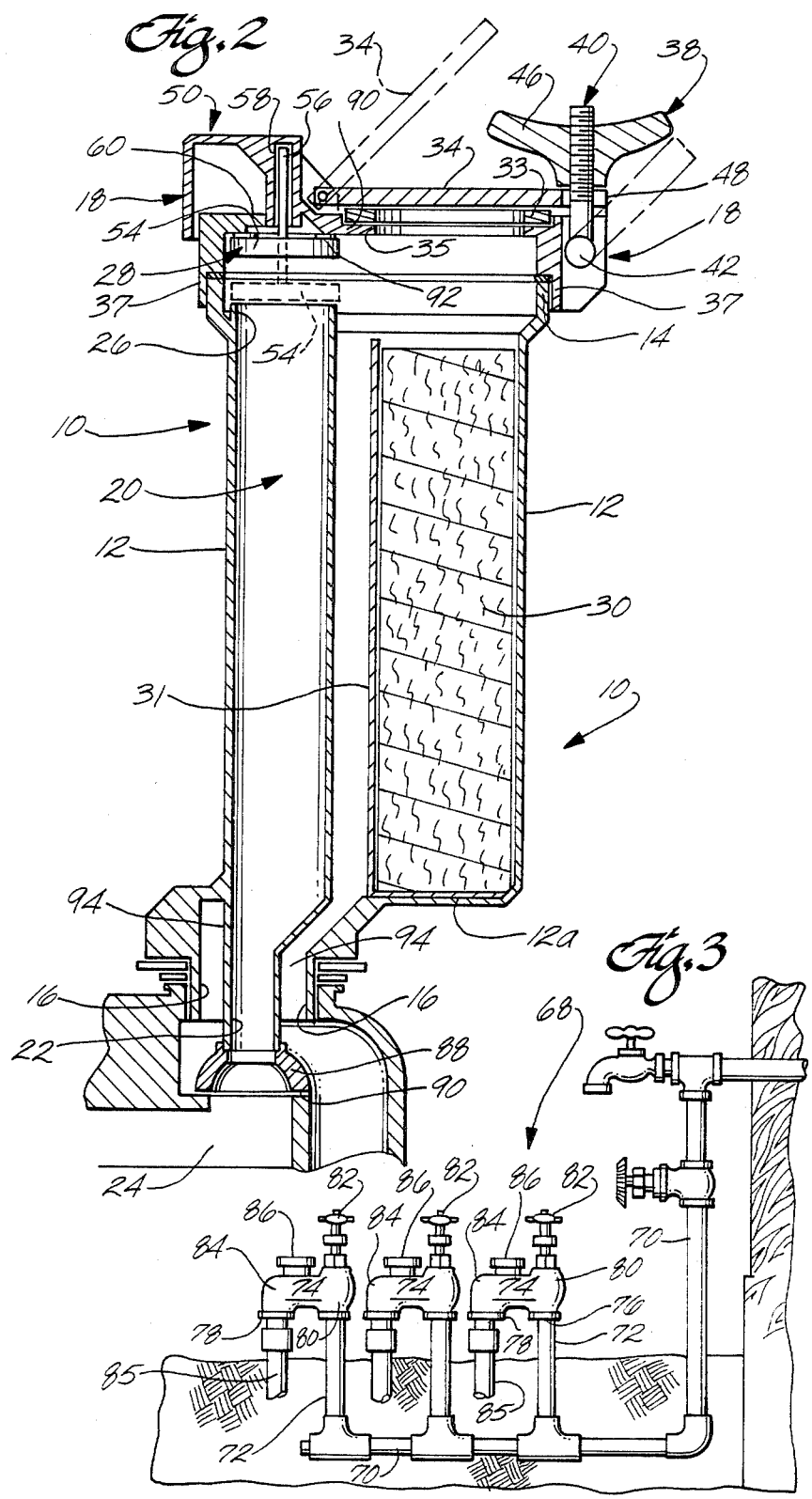

SOLUBLE MATERIAL DISTRIBUTING DEVICE

FIELD OF THE INVENTION

This invention relates to a device configured to contain a material which is soluble in water and through which a water stream passes, thereby dissolving the material and delivering it to a lawn or garden through a sprinkler system.

BACKGROUND OF THE INVENTION

Various chemical compositions (materials) can be administered to vegetation, such as a lawn or garden, for proper care. These chemical compositions can include fertilizers, weed killers, anti-fungal agents and the like and can be administered in liquid or solid form.

One widely used method for administering solid compositions to a lawn is by means of a spreader device that includes a wheeled bin into which the composition is loaded. The bin generally has sloped sides with an outlet along the length of its bottom. As the bin is pushed across the lawn, the wheels rotate a feeder which is above the outlet along its length. The feeder carries the composition to the outlet from which it falls by gravity onto the lawn.

Uneven distribution of the composition is a common occurrence when using the wheeled bin spreader device. In many instances, undesirably large amounts of the composition are administered at locations where the device is stopped or must be turned. This can result in killing the grass at that location. Working with solid compositions may also be less than desirable because of the dust it creates and possible breathing hazards.

A common way of administering a composition in a liquid form is by combining it with the water stream used for watering the vegetation. For example, devices have been developed that can be operatively connected at a hose outlet so that the water flowing from the hose entrains appropriate small amounts of a composition provided in either liquid or solid form contained in the device. While this method is fairly convenient, spraying the material with a hose inherently results in less uniform distribution than desired.

Many lawns are presently provided with a permanent sprinkler system. The system consists of a main conduit which branches off into a plurality of lines, each of which includes a stop valve (either automatic or manual) and an anti-siphon valve. Each such stop valve/anti-siphon valve combination feeds 4 to 6 sprinkler heads which are placed uniformly about the area to be watered.

There is a need for a device which can either be easily and economically combined with an already existing permanently installed sprinkler system or which can be incorporated into a newly installed sprinkler system for providing uniform distribution of a chemical composition to an area to be watered.

SUMMARY OF THE INVENTION

A material feeder device is provided for assembly on an existing sprinkler system for delivery of material to a lawn or garden for proper care. The feeder includes a housing open at its top and bottom which is configured to contain a material to be dissolved in a water stream which flows through the housing. The open bottom of the housing provides an outlet for the water stream. Means are connected to the housing for closing the top of the housing when in a first position and for opening the top of the housing when in a second position so that the material to be dissolved can be placed into the housing. A hollow conduit having an inlet for communication with the water supply and an outlet is provided. The conduit extends upwardly from its inlet through the open housing bottom with the conduit outlet being below the housing top. The only fluid connection between the water supply line and the housing outlet is through the conduit. A check valve is operatively mounted at the conduit outlet to prevent water from flowing back from within the housing through the conduit and into the water supply line.

In operation, water flows into the conduit inlet, up through the conduit and out from its top. The water stream then contacts and dissolves the material in the feeder. The water solution containing the dissolved material flows out from the open bottom of the housing for distribution via a sprinkler system.

BRIEF DESCRIPTION OF THE DRAWINGS

These and other features, aspects and advantages of the present invention will be more fully understood when considered with respect to the following detailed description, appended claims and accompanying drawings, wherein:

FIG. 1 is a perspective partially cut-away semi-schematic view of one preferred embodiment of a material feeder device provided in accordance with practice of principles of the invention;

FIG. 2 is a semi-schematic cross-sectional side view of the material feeder device of FIG. 1;

FIG. 3 is a schematic view of a portion of a typical permanently installed sprinkler system, including anti-siphon valve assemblies.

DETAILED DESCRIPTION

Referring to FIGS. 1 and 2, there are shown perspective and cross-sectional side views, respectively, of a preferred embodiment of a material feeder device 10 provided for use in a sprinkler system in accordance with practice of principles of this invention. The positions of the feeder device components relative to each other are described below as if the device were in position for use in a sprinkler system as is shown in the drawings.

The feeder 10 includes a housing 12 that is open at its top 14 and bottom 16. The housing is configured to contain a material, which, as is described below in greater detail, is to be dissolved in a water stream which flows through the housing. A lid assembly 18 is mounted on top of the housing. A hollow conduit 20 having an inlet 22 for communication with a water supply line 24 extends upwardly from the inlet through the housing 12. The conduit outlet 26 is below the top 14 of the housing. A check valve 28 is mounted in the lid assembly 18. The check valve is in alignment with the conduit outlet 26 for seating on the conduit outlet when the check valve is in its lowered position.

In the illustrated embodiment, the housing 12 is generally retangular in horizontal cross-section and is made of a clear plastic, such as polycarbonate resin manufactured and supplied by General Electric Company, Polymers Product Department of Pittsfield, Mass. Other materials can be used for the housing, if desired and the housing can have other shapes.

The material to be dissolved in the water stream that flows through the housing is preferably provided in the form of a solid pellet, such as the pellet 30 shown in place in the housing in FIGS. 1 and 2. Such pellets can be formed by standard pellet forming techniques and can be chemical compounds which are active as fertilizers, weed killers, fungus preventatives, or the like. If desired, different pellets can be provided for each desired function or the chemical compounds can be combined to provide a pellet useful for more than one function. For example, a combined pellet can contain compounds active both as fertilizers and weed killers. Other combinations of chemical compounds can be provided as desired.

In one embodiment, a screen 31 is between the pellet 30 and the outlet of the feeder. The screen extends from the bottom 12a of the housing 12 approximately to its top 14 and has a mesh size small enough to contain any chunks of matrial that may be eroded from the pellet which are sufficiently large to plug the feeder outlet or sprinker heads. Thus, the screen ensures that the material is properly dissolved before it exits the feeder in the water stream.

The lid assembly 18 includes a stationary portion 32 which, as described in greater detail below, is configured to provide an anti-siphon feature to the device. A door 34 is hinged to the stationary portion 32 for up and down movement toward and away from the top 14 of the housing. A flexible gasket 33 is between the door and a flange 35 on the lid assembly to provide a seal against water flow from the housing when the door is in its first or closed position as shown in solid lines in FIGS. 1 and 2. The door provides access to the interior of the housing when in its second position, as is shown in dashed lines in FIG. 2, so that the pellet 30 can be placed into the housing. The lid assembly 18 includes a peripheral depending flange 37 which is frictionally engaged to the outer surface of the top 14 of the housing 12 to provide a water tight seal between the housing and lid.

A latch mechanism 38 on the side of the lid assembly opposite from the stationary portion 32 (on the right hand side of the drawings of FIGS. 1 and 2) is used to maintain the door in its closed position. The latch mechanism includes a metal post 40, which, on one end is mounted for swiveling movement on a horizontal pin 42 which, in turn, is mounted for rotational movement in a pair of horizontally spaced apart mounting brackets 44 (best seen in FIG. 1) which extend away from the right hand side of the lid assembly (as shown in FIGS. 1 and 2). The opposite end of the post 40 is threaded to accept a wing nut 46. A groove 48, configured to accept the post 40 when the door is in its closed position, is in the side of the door adjacent the latch mechanism. To close the door, it is moved to its fully lowered position and the wing nut 46 is screwed upwardly on the post 40 so that the post can be swiveled into position in the groove 48. The post is then swiveled into position in the groove and the wing nut is tightened down. To open the door, the wing nut is screwed upwardly on the post, the post is swiveled out from the grove 48 and the door is lifted.

The construction of the stationary portion 32 of the lid assembly in combination with the check valve 28 provides an anti-siphon feature to the feeder. The stationary portion 32 includes an box-shaped housing or projection 50 which is raised from the plane of the horizontal surface of the portion 32. Turning particularly to FIG. 2, the check valve 28 includes a disk 54 that lies in a horizontal plane and a stem 56 which is attached to the disk at about the center of the disk and extends upwardly therefrom. An elongated cylindrical vertically extending bore 58 is in the housing 50 and the check valve stem 56 is slidably mounted in the bore 58 for up and down movement. An orifice 60, which is in aligned with the check valve disk 54 is through the stationary portion 32 of the lid assembly 18. The check valve and orifice are configured so that the orifice is closed by the check valve disk when the disk is in its fully raised position (as shown in FIG. 2 in solid lines) and the orifice is open to the atmosphere when the disk is moved to below its fully raised position. The check valve disk seats on the outlet 26 of the conduit 20 when the check valve is in its fully lowered position (as is shown in dashed lines in FIG. 2). Thus, as is described in greater below, the check valve 28 in combination with the orifice provide the anti-siphon feature to the device preventing water is from flowing back from within the housing 12 through the conduit 22 and into the water supply line 24.

INSTALLATION

Turning to FIG. 3, a schematic view of a portion of a prior art sprinkler system is shown. The system includes a supply line 70, with several branch lines 72. Each branch line 72 is connected to an anti-siphon valve assembly 74. Each anti-siphon valve assembly includes an inlet 76 and an outlet 78 connected together by two chambers; the first chamber 80 at the inlet having a stop valve 82 mounted therein and the second chamber 84 at the outlet having an anti-siphon check valve mounted therein. The stop valve can be manually operated, as shown, or can be electrically operated as in an automatic sprinkler system. The stop valve passes a water stream to the second chamber 84, out the outlet 78 and into a sprinkler head supply line 85 when the valve is open and stops water flow to the second chamber when the valve is closed. Access to the anti-siphon check valve is provided by a screw-on cap 86.

To install the feeder device 10 provided in accordance with this invention the cap 86 is first removed. In one embodiment, a rubber fitting 88 (see FIGS. 1 and 2) is mounted onto the seating surface 90 of the inlet 24. The feeder 10 is then mounted onto the fitting 88 and in place of the removed cap 86 by means of a connection at the conduit inlet 22. Appropriate connector arrangements configured as desired, can be provided on the base of the housing 12 of the feeder 10 to cooperate with prior art anti-siphon valve arrangements so that the feeder may be properly installed in the existing sprinker system. In the embodiment illustrated in FIG. 1, external threads 91 are on the base of the housing 12 which mate with internal threads 93 on the flange 95 from which the cap 86 was removed. A locking ring 97 is provided having internal threads 99 engaged in the threads 91 on the base of the housing. Once the feeder is screwed onto the flange 95 the locking ring is tightened to fix the feeder in place.

OPERATION

In operation, the feeder 10 is mounted in place of an anti-siphon valve in a standard sprinkler system 68 as is described above. Once in place, the latch mechanism 38 is opened and the door 34 is raised. A pellet 30 of desired chemical composition is placed into the housing 12. The door 34 is then closed and the latch is moved into place and the wing nut 46 is tighened to seal the door against the housing top.

Water is then supplied to the device by opening the valve 82. The water flows into the first chamber 80 through the supply line 24 and upwardly through the conduit 20. the flow of water lifts the check valve disk 54 from its seat on the outlet 26 of the conduit 20 to thereby seat against the lower surface 90 of the stationary portion 32 of the lid assembly 18. In the illustrated embodiment a gasket 92 extends around the top of the disk 54 to provide the seating surface against the surface 90. The disk 54 is larger in horizontal cross section than the orifice 60 and its seating surface (the gasket 92) surrounds the orifice when the check valve is in its fully raised position seated against the lower surface of the lid. When the check valve is in its fully raised position it prevents water from flowing through the orifice and out from the feeder. During the time the valve 82 is open, the water pressure in the feeder maintains the check valve in its fully raised position.

Water flows from the top 26 of the conduit 20 across and around the pellet 30 thereby dissolving the pellet. The water and dissolved chemical composition of the pellet then flows out through the bottom 16 of the housing by means of a annulus 94 which surrounds the conduit inlet 22. The water solution flows from the feeder outlet into the second chamber 84, through the outlet 78 and into the sprinkler system for delivery to the sprinkler heads (not shown).

When the sprinkling operation is complete, the valve 82 is closed and the water flow to the feeder is thereby stopped. The pressure in the feeder drops and the check valve disk 54 of the check valve 28 moves from engagement with the surface 90 to its lowered position seated on the outlet 26 of the conduit 20 (as shown in dashed lines in FIG. 2). This movement of the check valve opens the vent orifice 60 thereby venting the feeder to the atmosphere. The check valve, when in its position seated on the outlet 26, prevents the flow of water from the feeder through the conduit 20, back into the line 24 and into lines upstream from the line 24. The prevention of contamination of the water flowing in the lines upstream from the feeder is made possible by the design of the present invention, in part because the only fluid connection between the water supply line 24 and the housing outlet is through the conduit 20.

In one embodiment of practice of the present invention it takes only several minutes to dissolve the entire pellet 30 in each such housing 12. In this embodiment the pellet comprises a chemical compound useful as a fertilizer which is formulated so that only one such pellet need be dissolved each month for proper lawn care. As is mentioned previously, however, pellets of other chemical compounds such as anti-fungal materials or weed killers and the like may also be provided. Additionally, different formulations may be used with different dissolving requirements.

In one embodiment of the invention, the siphon valve assembly is provided with the feeder 10 installed. This embodiment includes the stop valve 82, associated pipes and fittings and the feeder 10 as shown in FIG. 1.

The above descriptions of preferred embodiments of the feeder provided in accordance with practice and principles of this invention are for illustrative purposes. Because of the variations which will be apparent to those skilled in the art, the present invention is not intended to be limited to the particular embodiments described above. The scope of the invention is defined in the following claims.

What is claimed:

1. A material feeder comprising:
 (a) a housing open at its top and bottom and configured to contain a material to be dissolved in a water stream which flows through the housing, the open bottom of the housing providing an outlet for the water stream;
 (b) means connected to the housing for closing the top of the housing when in a first position and for opening the top of the housing when in a second position so that the material to be dissolved can be placed into the housing;
 (c) a hollow conduit having an inlet for communication with a water supply line and an outlet, the conduit extending upwardly from its inlet through the open housing bottom with the conduit outlet being below the housing top, the only fluid connection between the water supply line and the housing outlet being through the conduit; and
 (d) a check valve operatively mounted at the conduit outlet to prevent water from flowing back from within the housing through the conduit and into the water supply line wherein the check valve includes a horizontally extending valve disk on an elongated stem which extends vertically upwardly from the disk, the housing closure means including an elongated bore extending vertically upwardly in which the check valve stem is mounted for sliding movement and an orifice in alignment with the check valve disk, the orifice being closed by the disk when the disk is in its fully raised position, and the orifice being open to the atmosphere when the disk is moved to below its fully raised position.

2. A material feeder as is claimed in claim 1 also comprising a screen between the material to be dissolved and the outlet of the feeder.

3. A sprinkler system comprising:
 (a) a material feeder assembly having an inlet and an outlet;
 (b) a water supply line in fluid communication with the feeder assembly inlet;
 (c) a supply line in fluid communication with the feeder assembly outlet to supply a solution of water and a soluble material contained in the feeder assembly to one or more sprinkler heads, the material feeder assembly comprising:
  (i) a housing open at its top and bottom and configured to contain the soluble material, wherein a water stream flows from the water supply line through the housing thereby dissolving the soluble material so that the solution flows out the open bottom of the housing into a sprinkler head supply line;
  (ii) closure means connected to the housing which can be moved to a first position for closing the top of the housing during the time water is being supplied to the sprinkler heads and which can be moved to a second position for opening the top of the housing so that the soluble material can be placed into the housing;
  (iii) a hollow conduit having an open first end which provides the inlet to the material feeder assembly and an open outlet at its second end, the conduit extending upwardly from the inlet end through the open housing bottom with the conduit outlet being below the housing top; and
  (iv) a check valve operatively mounted at the conduit outlet to prevent water from flowing back from within the housing through the conduit and into the water supply line wherein the check valve includes a horizontally extending valve disk on an elongated stem which extends vertically upwardly from the disk, the housing closure means including an elongated bore extending vertically upwardly in which the check valve stem is mounted for sliding movement and an orifice in alignment with the check valve disk, the orifice being closed by the disk when the disk is in its fully raised position, and the orifice being open to the atmosphere when the disk is moved to below its fully raised position.

4. An anti-siphon valve assembly comprising:

an inlet and an outlet connected together by two chambers, the first chamber at the inlet having a stop valve mounted therein for passing a water stream to the second chamber when the valve is open and for stopping water flow to the second chamber when the valve is closed, the second chamber having a material feeder device mounted thereon; the material feeder device comprising:

a housing open at its top and bottom and configured to contain a material to be dissolved in a water stream which flows through the housing, the open bottom of the housing providing an outlet for the water stream;

means connected to the housing for closing the top of the housing when in a first position and for opening the top of the housing when in a second position so that the material to be dissolved can be placed into the housing;

a hollow conduit having an inlet for communication with the first chamber and an outlet, the conduit extending upwardly from its inlet through the open housing bottom with the conduit outlet being below the housing top, the only fluid connection between the first chamber and the housing outlet being through the conduit; and a check valve operatively mounted at the conduit outlet to prevent water from flowing back from within the housing through the conduit and into the first chamber wherein the check valve includes a horizontally extending valve disk on an elongated stem which extends vertically upwardly from the disk, the housing closure means including an elongated bore extending vertically upwardly in which the check valve stem is mounted for sliding movement and an orifice in alignment with the check valve disk, the orifice being closed by the disk when the disk is in its fully raised position, and the orifice being open to the atmosphere when the disk is moved to below its fully raised position.

5. A material feeder as is claimed in claim 4 also comprising a screen between the material to be dissolved and the outlet of the feeder.

6. A material feeder as is claimed in claim 1 wherein the housing is made of clear plastic material.

7. A material feeder as is claimed in claim 3 wherein the housing is made of clear plastic material.

8. A material feeder as is claimed in claim 4 wherein the housing is made of clear plastic material.

* * * * *